United States Patent
Graves et al.

(10) Patent No.: US 12,299,575 B2
(45) Date of Patent: *May 13, 2025

(54) AUGMENTING NEURAL NETWORKS WITH EXTERNAL MEMORY

(71) Applicant: DeepMind Technologies Limited, London (GB)

(72) Inventors: Alexander Benjamin Graves, London (GB); Ivo Danihelka, London (GB); Timothy James Alexander Harley, London (GB); Malcolm Kevin Campbell Reynolds, London (GB); Gregory Duncan Wayne, London (GB)

(73) Assignee: DeepMind Technologies Limited, London (GB)

( * ) Notice: Subject to any disclaimer, the term of this patent is extended or adjusted under 35 U.S.C. 154(b) by 1221 days.

This patent is subject to a terminal disclaimer.

(21) Appl. No.: 17/093,373

(22) Filed: Nov. 9, 2020

(65) Prior Publication Data

US 2021/0117801 A1  Apr. 22, 2021

Related U.S. Application Data

(63) Continuation of application No. 15/374,974, filed on Dec. 9, 2016, now Pat. No. 10,832,134.

(Continued)

(51) Int. Cl.
*G06N 3/08* (2023.01)
*G06N 3/04* (2023.01)
(Continued)

(52) U.S. Cl.
CPC ............... *G06N 3/082* (2013.01); *G06N 3/04* (2013.01); *G06N 3/044* (2023.01); *G06N 3/063* (2013.01)

(58) Field of Classification Search
CPC .......... G06N 3/082; G06N 3/04; G06N 3/044; G06N 3/063; G06N 3/0442
See application file for complete search history.

(56) References Cited

U.S. PATENT DOCUMENTS 5,167,006 A * 11/1992 Furuta .................... G06N 3/063
706/41
6,092,018 A  7/2000 Puskorius et al.
(Continued)

FOREIGN PATENT DOCUMENTS

CN  101076806  11/2007
CN  101253493  8/2008
(Continued)

OTHER PUBLICATIONS

Office Action in European Appln. No. 16820464.2, dated May 27, 2021, 10 pages.
(Continued)

*Primary Examiner* — Kyle R Stork
*Assistant Examiner* — Tri T Nguyen
(74) *Attorney, Agent, or Firm* — Fish & Richardson P.C.

(57) ABSTRACT

Methods, systems, and apparatus, including computer programs encoded on computer storage media, for augmenting neural networks with an external memory. One of the systems includes a memory interface subsystem that is configured to perform operations comprising determining a respective content-based weight for each of a plurality of locations in an external memory; determining a respective allocation weight for each of the plurality of locations in the external memory; determining a respective final writing weight for each of the plurality of locations in the external memory from the respective content-based weight for the location and the respective allocation weight for the location; and writing data defined by the write vector to the
(Continued)

external memory in accordance with the final writing weights.

20 Claims, 9 Drawing Sheets

Related U.S. Application Data

(60) Provisional application No. 62/265,912, filed on Dec. 10, 2015.

(51) Int. Cl.
    *G06N 3/044*     (2023.01)
    *G06N 3/082*     (2023.01)
    *G06N 3/063*     (2023.01)

(56) References Cited

U.S. PATENT DOCUMENTS

| | | | |
|---|---|---|---|
| 2005/0041453 A1* | 2/2005 | Brazis | G11C 7/1006 365/63 |
| 2009/0172250 A1* | 7/2009 | Allen | G06F 12/0246 711/E12.001 |
| 2014/0180694 A1 | 6/2014 | Fastow et al. | |
| 2015/0220833 A1 | 8/2015 | Le | |

FOREIGN PATENT DOCUMENTS

| | | |
|---|---|---|
| CN | 103617235 | 3/2014 |
| CN | 103824291 | 5/2014 |
| CN | 104657776 | 5/2015 |
| CN | 105144164 | 12/2015 |
| WO | WO 0072256 | 11/2000 |

OTHER PUBLICATIONS

Amari, "Characteristics of sparsely encoded associative memory," Neural Networks, 1989, 2.6:451-457.
Bahdanau et al. "Neural machine translation by jointly learning to align and translate," CoRR, 2014, arXiv preprint arXiv, 1409.0473.
Bengio et al. "Curriculum learning," In Proceedings of the 26th annual international conference on machine learning, ACM, 2009, pp. 41-48.
Bollacker et al., "Freebase: a collaboratively created graph database for structuring human knowledge," Proceedings of the structure 2008 ACM SIGMOD international conference on Management of DATA. ACM, 2008, pp. 1247-1250.
Bottou., "From machine learning to machine reasoning," Machine learning, 2011, 94.2:133-149.
Chan et al., "Listen, attend and spell," CoRR, 2015, arXiv preprint arXiv, 1508.01211.
Das et al., "Learning Context-free Grammars: Capabilities and Limitations of a Recurrent Neural Network with an External Stack Memory," Advances in Neural Information Processing Systems 5., Jan. 1, 1993, 6 pages.
Daume et al., "Search-based structured prediction," Machine Learning, Jun. 1, 2009, 75(3):297-325.
Dean et al., "Large scale distributed deep networks," Advances in neural information processing systems, 2012, pp. 1223-1231.
Fusi et al., "Cascade models of synaptically stored memories," Neuron 45.4 2005, pp. 599-611.
Ganguli et al., "Memory traces in dynamical systems," Proceedings of the National Academy of Sciences, 2008, 105.48:18970-18975.
Graves et al., "Neural turing machines" CoRR, 2014, arXiv preprint arXiv, 1410.5401, 26 pages.
Graves et al., "Generating sequences with recurrent neural networks," CoRR, Aug. 2014, arXiv preprint arXiv, 1308.0850.
Graves et al., "Speech recognition with deep recurrent neural networks," IEEE international conference on acoustics, speech and signal processing, 2013, pp. 6645-6649.
Graves., "Generating sequences with recurrent neural networks," CoRR, Aug. 2014, arXiv preprint arXiv, 1308.0850.
Grefenstette et al., "Learning to Transduce with Unbounded memory," CoRR, Nov. 2015, arXiv preprint arXiv 1506.02516, 14 pages.
Gregor et al., "DRAW: A recurrent neural network for image generation," CoRR, 2015, arXiv prepring arXiv, 1502.04623.
Hinton., "Learning distributed representations of concepts," Proceedings of the eighth annual conference of the cognitive science society, 1986, 1:12.
Hochreiter et al., "Long short-term memory," Neural computation, 1997, 9.8:1735-1780.
Hopfield., "Neural networks and physical systems with emergent collective computational abilities," Proceeding of the national academy of sciences, 1982, 79.8:2554-2558.
International Search Report and Written Opinion in International Application No. PCT/US2016/066020, dated Mar. 15, 2017, 19 pages.
Joulin et al., "Inferring Algorithmic Patterns with Stack-Augmented Recurrent Nets," CoRR, Jun. 2015, arXiv preprint arXiv1503.01007, 10 pages.
JP Office Action in Japanese Appln. No. 2018-530744, dated Sep. 9, 2019, 6 pages (with English translation).
Kakade et al., "Approximately optimal approximate reinforcement learning," ICML, Jul. 8, 2002, 2:267-274.
KR Office Action in Korean Appln. No. 10-2018-7017730, dated Dec. 12, 2019, 23 pages (with English Translation).
KR Office Action in Korean Appln. No. 10-2018-7017730, dated May 7, 2020, 10 pages (with English translation).
Kriete et al., "Indirection and symbol-like processing in the prefrontal cortex and basal ganglia," Proceedings of the National Academy of Sciences, 2013, 110.41:16390-16395.
Krizhevsky et al., "Imagenet classification with deep convolutional neural networks," In Advances in neural information processing systems, 2012, pp. 1097-1105.
Kurach et al., "Neural Random-Access Machines," CoRR, Nov. 2015, arXiv preprint arXiv1511.06392v1, 13 pages.
Miller, "Wordnet: a lexical database for English," Communications of the ACM, 1995, 38(11):39-41.
Minsky, "Steps toward artificial intelligence," Proceedings of the IRE, 1961, 49.1:8-30.
Mnih et al., "Human-level control through deep reinforcement learning," Nature, Feb. 26, 2015, 518:529-533.
Rae et al., "Scaling Memory-Augmented Neural Networks with Sparse Reads and Writes," CoRR, Oct. 2016, arXiv preprint arXiv1610.09027, 17 pages.
Ross et al., "A Reduction of Imitation Learning and Structured Prediction to No-Regret Online Learning," AISTATS, Apr. 11, 2011, 1(2):6.
Schulman et al., "High-dimensional continuous control using generalized advantage estimation," CoRR, 2015, arXiv preprint arXIV, 1506.02438.
Sutskever et al., "Sequence to sequence learning with neural networks," In Advances in neural information processing systems, 2014, pp. 3104-3112.
Van der Maaten et al., "Visualizing data using t-SNE," Journal of Machine Learning Research, Nov. 9, 2008, pp. 2579-2605.
Vinyals et al., "Pointer networks," Advances in Neural Information Processing Systems, 2015, pp. 2692-2700.
Wawrzyński, "Real-time reinforcement learning by sequential actor-critics and experience replay," Neural Networks, Dec. 31, 2009 22(10):1484-1497.
Werbos, "Backpropagation through time: what it does and how to do it," Proceedings of the IEEE, 1990, 78(10):1550-1560.
Weston et al., "Memory Networks," CoRR, 2014, arXiv preprint arXiv, 1410.3916.
Wilson et al., "Dynamic storage allocation: A survey and critical review," Memory Management. Springer Berlin Heidelberg, 1995, 78 pages.
Winograd, "Procedures as a representation for data in a computer program for understanding natural language," Mass. Inst. of Tech. Cambridge Project Mac., 1971, MAC-TR-84.
Zaremba et al., "Learning to execute," CoRR, 2014, arXiv preprint arXiv, 1410.4615.

(56) References Cited

OTHER PUBLICATIONS

Zhang et al., "Structured Memory for Neural Turing Machines," CoRR, Oct. 2015, arXiv:1510.03931v3, 4 pages.
Office Action in Chinese Appln. No. 201680072537.6, dated Sep. 29, 2021, 31 pages (with English translation).
Liu et al., "Sparse convolutional neural networks," Proceedings of the IEEE Conference on Computer Vision and Pattern Recognition, 2015, pp. 806-814.
Office Action in Chinese Appln. No. 201680072537.6, dated Jun. 21, 2022, 8 pages (with English translation).

* cited by examiner

AUGMENTING NEURAL NETWORKS WITH EXTERNAL MEMORY

CROSS REFERENCE TO RELATED APPLICATIONS

This application is a continuation of U.S. patent application Ser. No. 15/374,974, filed on Dec. 9, 2016, which is a non-provisional of and claims priority to U.S. Provisional Patent Application No. 62/265,912, filed on Dec. 10, 2015, the entire contents of which are hereby incorporated by reference.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems. In general, an augmented neural network system includes a neural network configured to receive a neural network input and generate a neural network output, an external memory, i.e., a memory that is external to the neural network, that stores values derived from portions of the neural network output, and a memory interface subsystem that is configured to receive portions of the neural network output and erase, write, and read from the external memory using the received portions.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By augmenting a neural network with an external memory, i.e., a memory that is external to the neural network, the augmented neural network can more accurately generate outputs from received inputs for a variety of machine learning tasks. In particular, in order to facilitate processing of a given input from a sequence of inputs, the augmented neural network can effectively use information generated by the augmented neural network during processing of many preceding inputs in the sequence by reading from the external memory. Similarly, in order to facilitate processing of subsequent inputs from the sequence, the augmented neural network can store information generated during processing of the current input in the external memory. Additionally, the size of the external memory can be increased without increasing the number of trainable parameters of the augmented neural network. Furthermore, because the entire mechanism for accessing the external memory can be treated as being differentiable, the augmented neural network system can be trained efficiently.

As compared to other architectures for augmenting a neural network with an external memory, the system as described in this specification allows the neural network to better make use of the external memory by way of improved reading, writing, and erasing mechanisms. For example, the system as described in this specification allows the neural network to write to the external memory using a mechanism that ensures that blocks of allocated memory do not overlap and interfere. Additionally, the system as described in this specification allows the neural network to free memory locations that have already been written to and, hence, reuse memory when processing long system input sequences. Additionally, the system as described in this specification tracks the order in which writes are made, allowing the neural network to preserve sequential information written to the external memory and recover the order of writes for reading from the external memory even if the write head jumps to a different part of the memory.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1A:
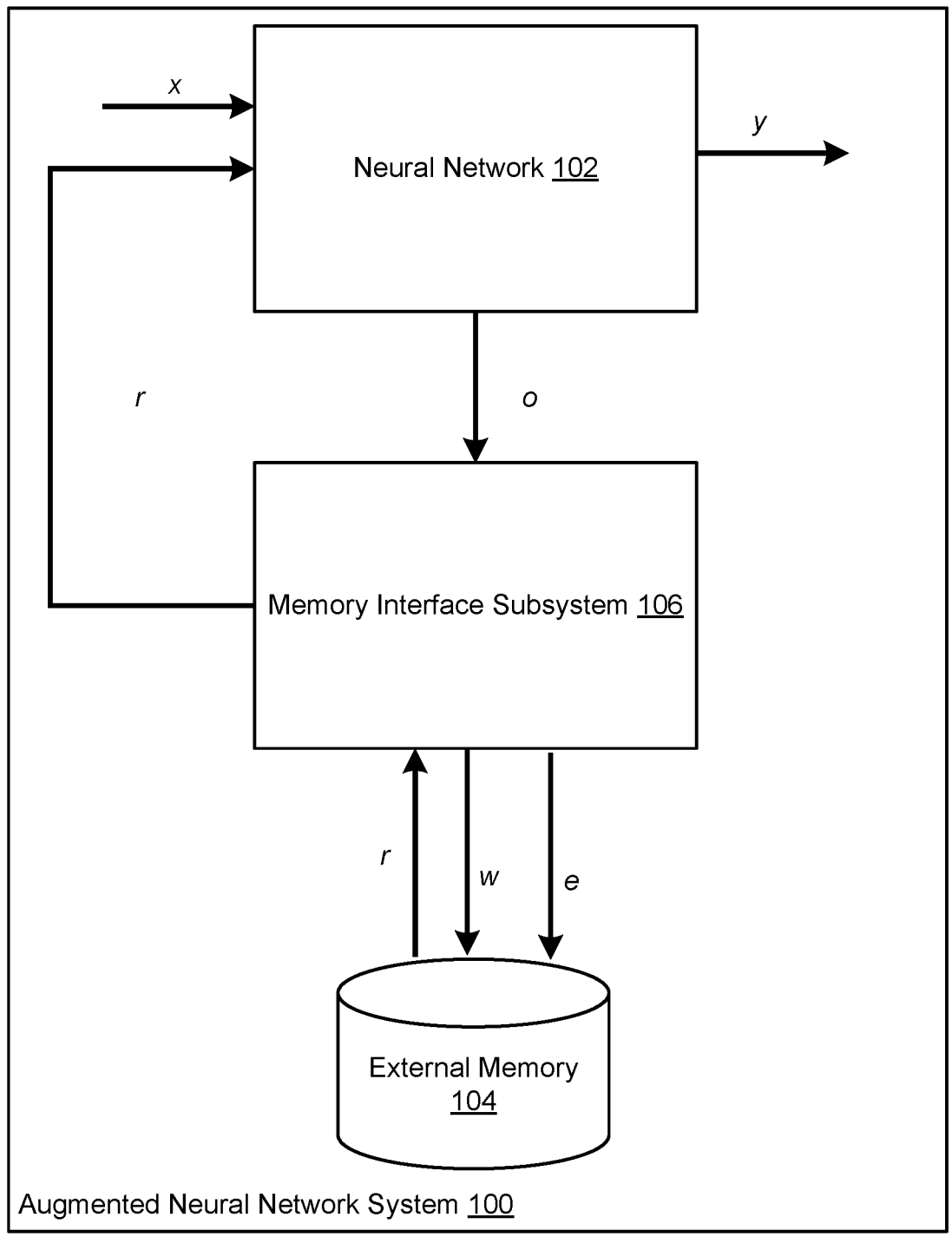
FIG. 1A shows an example augmented neural network system.

FIG. 1A shows an example augmented neural network system 100. The augmented neural network system 100 is an example of a system implemented as computer programs on one or more computers in one or more locations, in which the systems, components, and techniques described below are implemented.

The augmented neural network system 100 is a machine learning system that receives a sequence of system inputs and generates a sequence of system outputs from the system inputs. For example, the augmented neural network system 100 can receive a system input x as part of an input sequence and generate a system output y from the system input x. The augmented neural network system 100 can store the generated sequence of outputs in an output data repository or provide the output for use for some other immediate purpose, e.g., for presentation to a user or for further processing by another system.

The augmented neural network system 100 can be configured to receive any kind of digital data input and to generate any kind of score, classification, or regression output based on the input.

As one example, augmented neural network system 100 can be configured to perform a graph data processing task, i.e., a task that requires the system to identify and explore patterns in a graph structure. In particular, if the inputs to the augmented neural network system 100 are representation of portions of a graph, e.g., a sequence of vectors that represent a serialized version of the nodes and edges of the graph, and a query that relates to the graph, the output generated based on the input can define an answer to the query, e.g., can define the shortest path through the graph from one node to another, can define data missing from the graph, e.g., missing nodes or edges in the graph. As another example, if the inputs to the augmented neural network system 100 are representation of portions of a graph, e.g., a sequence of vectors that represent a serialized version of the nodes and edges of the graph, the output can be a classification output that includes scores for each of a set of categories, with each score representing an estimated likelihood that the graph belonging to the category.

As another example, if the inputs to the augmented neural network system 100 are images or features that have been extracted from images, the output generated by the augmented neural network system 100 for a given image may be scores for each of a set of object categories, with each score representing an estimated likelihood that the image contains an image of an object belonging to the category.

As another example, if the inputs to the augmented neural network system 100 are Internet resources (e.g., web pages), documents, or portions of documents or features extracted from Internet resources, documents, or portions of documents, the output generated by the augmented neural network system 100 for a given Internet resource, document, or portion of a document may be a score for each of a set of topics, with each score representing an estimated likelihood that the Internet resource, document, or document portion is about the topic.

As another example, if the inputs to the augmented neural network system 100 are features of an impression context for a particular advertisement, the output generated by the augmented neural network system 100 may be a score that represents an estimated likelihood that the particular advertisement will be clicked on.

As another example, if the inputs to the augmented neural network system 100 are features of a personalized recommendation for a user, e.g., features characterizing the context for the recommendation, e.g., features characterizing previous actions taken by the user, the output generated by the augmented neural network system 100 may be a score for each of a set of content items, with each score representing an estimated likelihood that the user will respond favorably to being recommended the content item.

As another example, if the input to the augmented neural network system 100 is text in one language, the output generated by the augmented neural network system 100 may be a score for each of a set of pieces of text in another language, with each score representing an estimated likelihood that the piece of text in the other language is a proper translation of the input text into the other language.

As another example, if the input to the augmented neural network system 100 is a spoken utterance, a sequence of spoken utterances, or features derived from one of the two, the output generated by the augmented neural network system 100 may be a score for each of a set of pieces of text, each score representing an estimated likelihood that the piece of text is the correct transcript for the utterance or sequence of utterances.

As another example, the augmented neural network system 100 can be part of a speech synthesis system.

As another example, the augmented neural network system 100 can be part of a video processing system.

As another example, the augmented neural network system 100 can be part of a dialogue system.

As another example, the augmented neural network system 100 can be part of an autocompletion system.

As another example, the augmented neural network system 100 can be part of a text processing system.

As another example, the augmented neural network system 100 can be part of a reinforcement learning system.

In particular, the augmented neural network system 100 includes a neural network 102 and an external memory 104. The neural network 102 may be a feedfoward neural network or a recurrent neural network, e.g., a shallow or deep long short-term memory (LSTM) neural network, that is configured to receive a neural network input and process the neural network input to generate a neural network output.

Generally, the neural network input received by the neural network 102 is a combination of the current system input and data read from the external memory by a memory interface subsystem 106. For example, the neural network 102 may be configured to receive the current system input x and data r read from the external memory 104 and to generate a neural network output that includes data y defining the system output and additional output o that is provided to the memory interface subsystem 106.

The memory interface subsystem 106 receives outputs generated by the neural network, e.g., the portion o of the neural network output o+y (with the + signifying concatenation), and translates the received outputs into erase, read, and write operations to be performed on the external memory 104. That is, the memory interface subsystem 106 receives an output o from the neural network 102 and, based on the output o, erases data e from the external memory 104, writes data w to the external memory 104, and reads data r from the external memory 104. The data read by the memory interface subsystem 106 can then be provided to the neural network 102 as a portion of a later neural network input, e.g., along with a system input.

Generally, the output portion o includes a write portion for use by the memory interface subsystem 106 in writing to the external memory 104, a respective read portion for each of one or more read heads used by the memory interface subsystem 106 to read from the external memory 104, and an erase portion for use by the memory interface subsystem 106 in erasing from the external memory 104.

The external memory 104 stores data vectors written to the external memory 104 by the memory interface subsystem 106. In some implementations, the external memory 104 is a real-valued matrix memory that has elements $M(i,j,t)$, where i indexes location, j indexes the vector element, and t indexes time. Thus, $M(i,j,t)$ would be the value stored at element j of the vector stored at location i in the external memory 104 at time t. By configuring the external memory 104, the memory interface subsystem 106, and the neural network 102 in this manner, the components of the augmented neural network system 100 can be treated as being entirely differentiable, allowing the augmented neural network system 100 to be effectively trained.

Figure 1B:
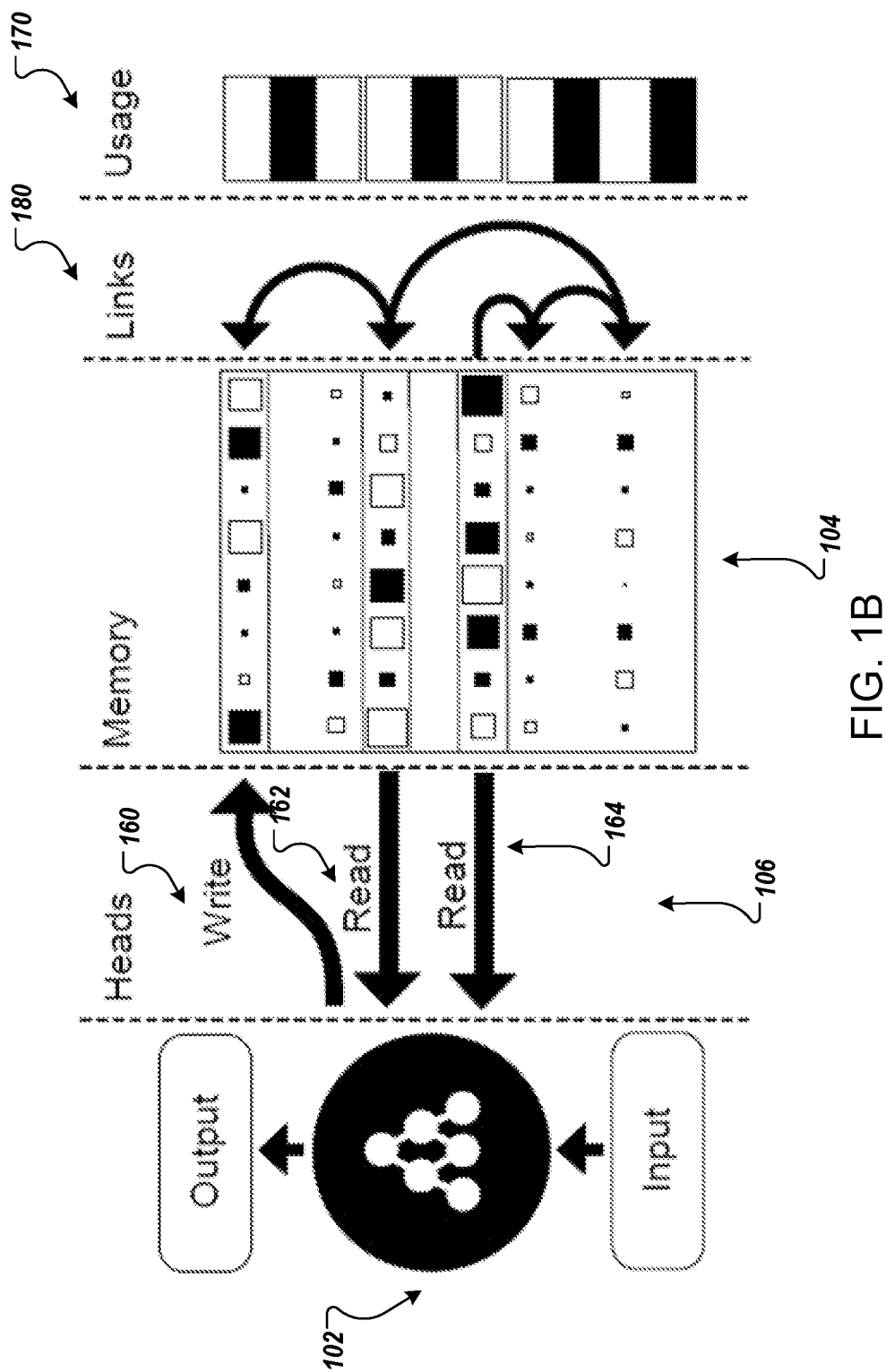
FIG. 1B is a conceptual diagram of the operation of the example augmented neural network system.

FIG. 1B is a conceptual diagram of the operation of the example augmented neural network system 100.

As shown in FIG. 1B, the neural network 102 receives a neural network input ("input") and generates a neural network output ("output"). The memory access subsystem 106 transforms the neural network output into operations performed by a write head and two read heads on the external memory 104. In particular, the memory access subsystem 106 uses the neural network output to perform a write operation 160 and two read operations 162 and 164 on the external memory.

To perform the write operation 160, the memory access subsystem 106 maintains usage values 170 for the locations in the external memory 104. Each usage value represents a degree to which the availability of the corresponding location to store data is being used. From the usage values 170, the memory access subsystem 106 determines how available each of the locations in the external memory 104 is for a modification of the data stored in the location, and then writes to the external memory 104 in accordance with that availability. Writing to the external memory is described in more detail below with reference to FIGS. 2-4.

To perform each of the read operations 162 and 164, the memory access subsystem 106 maintains link data 180 that tracks a history of writing weights for previous writing operations performed on the external memory 104. From the link data 180, the memory access subsystem 106 generates a respective set of weights for each read head, and then reads from the external memory 104 in accordance with the generated weights. Reading from the external memory is described in more detail below with reference to FIGS. 2, 6, and 7.

While the example of FIG. 1B shows two read heads, in other examples, the memory access subsystem 106 uses a different number of read heads, e.g., one, three, or five.

Figure 2:
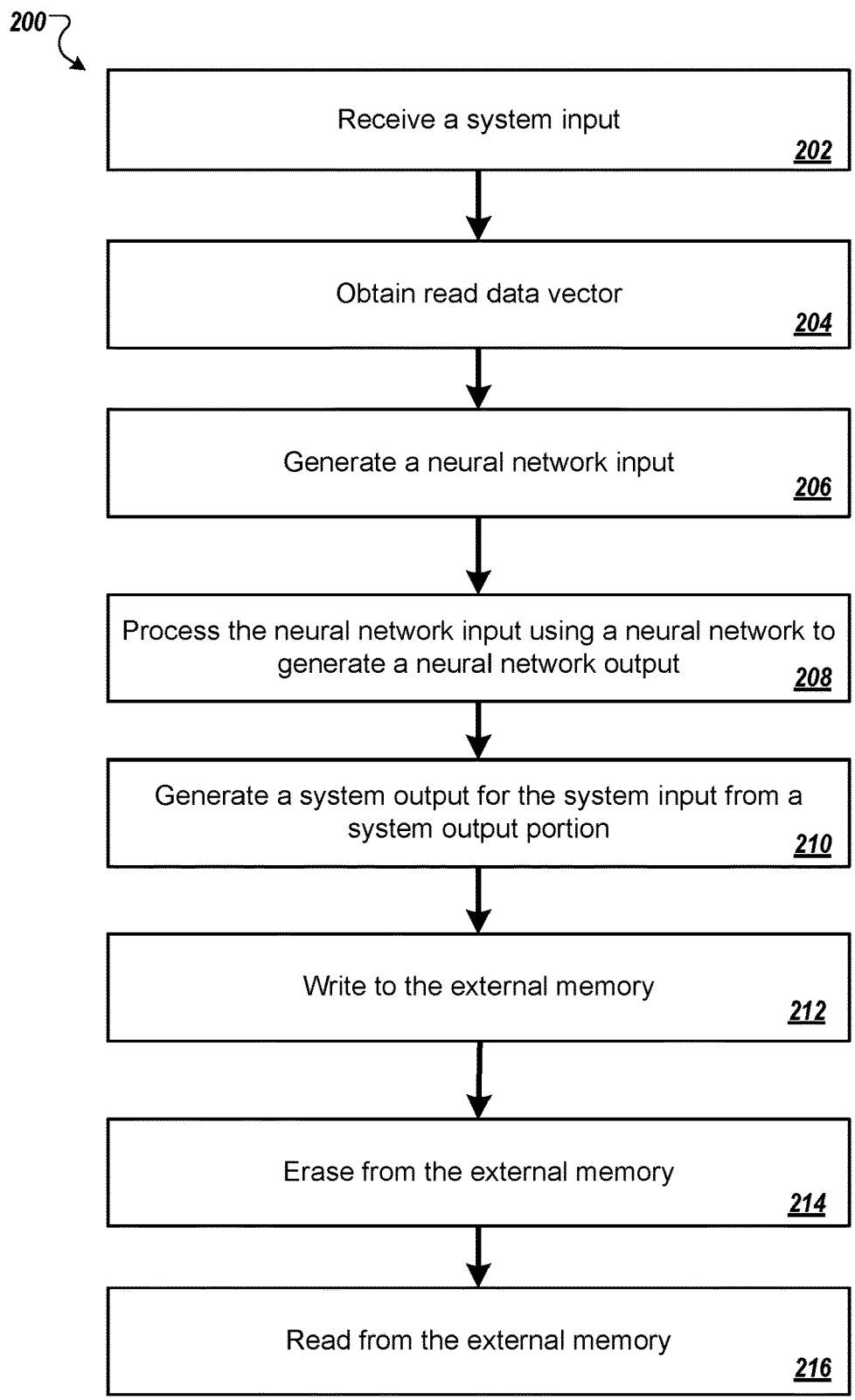
FIG. 2 is a flow diagram of an example process for generating a system output from a system input.

FIG. 2 is a flow diagram of an example process 200 for generating a system output from a system input. For convenience, the process 200 will be described as being performed by a system of one or more computers located in one or more locations. For example, an augmented neural network system, e.g., the augmented neural network system 100 of FIG. 1A, appropriately programmed in accordance with this specification, can perform the process 200.

The system receives a system input (step 202). The system input is one of a sequence of system inputs received by the system.

The system obtains one or more read data vectors generated by reading from an external memory (step 204), e.g., the external memory 104 of FIG. 1A. Generally, each read data vector corresponds to a respective read head and was generated by the system by reading from the external memory using the corresponding read head during processing of the preceding input in the sequence of system inputs.

The system generates a neural network input by combining the system input and the data read from the external memory (step 206). For example, the system can concatenate the system input and each of the read data vectors to generate the neural network input. For the first system input, the system can concatenate the system input with a predetermined vector, e.g., a learned state of the neural network.

The system processes the neural network input using a neural network, e.g., the neural network 102 of FIG. 1A, to generate a neural network output from the neural network input (step 208). Depending on the implementation, the neural network can either be a feed-forward neural network, e.g., a convolutional neural network or another kind of deep feed-forward neural network, or a recurrent neural network, e.g., an LSTM neural network. If the neural network is a recurrent neural network, the recurrent neural network also uses the internal state of the recurrent neural network from the preceding neural network input in the sequence in processing the current neural network input to generate the neural network output. In some implementations, the neural network includes both recurrent and feed-forward layers.

The system generates a system output for the system input from a system output portion of the neural network output (step 210). The system output portion of the neural network output is a predetermined portion of the neural network output that has been designated, e.g., by a system administrator, as the portion to be used to generate the system output, i.e., so that the same portion of the neural network output is used to generate the system output for each output generated by the neural network.

In some implementations, the system provides the system output portion as the system output for the system input. In some other implementations, however, the system combines, e.g., concatenates, the data read from the external memory as described below with reference to step 216 with the system output portion and either provides the concatenated output as the system output or applies one or more transformations to the concatenated output in order to generate the system output.

The system writes to the external memory using a write portion of the neural network output (step 212). The write portion of the neural network output is a predetermined portion of the neural network output that has been designated as the portion to be used in writing to the external memory.

In particular, in order to write to the external memory, the system determines writing weights using the write portion of the neural network output and writes a write vector to the external memory in accordance with the writing weights. Generally, the writing weights are a combination of content-based writing weights and allocation weights for the locations in the external memory.

Determining writing weights and writing to the external memory is described in more detail below with reference to FIGS. 3 and 4.

The system erases from the external memory using an erase portion of the neural network output (step 214). The erase portion of the neural network output is a predetermined portion of the neural network output that has been designated as the portion to be used in erasing from the external memory. In particular, the system erases from the external memory using an erase vector defined by the erase portion and in accordance with the final writing weights described above. Erasing from the external memory is described in more detail below with reference to FIG. 5.

For each of the one or more read heads, the system reads from the external memory using a read portion of the neural network output for the read head to generate a read vector for the read head (step 216). The read portion of the neural network output for a given read head is a predetermined portion of the neural network output that has been designated as the portion to be used in reading from the external memory using the read head. That is, each read head is assigned a different portion of the neural network output.

In particular, in order to read from the external memory using a read head, the system determines reading weights using the read portion of the neural network output for the read head and then reads from the locations in the external memory in accordance with the reading weights. Generally, the system determines the reading weights for a given read head from content-based weights and one or more history weights for the locations in the external memory.

Determining reading weights and reading from the external memory is described in more detail below with reference to FIGS. 6 and 7.

In implementations where the system uses multiple read heads to read from the external memory, the system performs multiple read operations for a given system input and can perform the multiple read operations in parallel and independently of each other set of the operations. Once a read vector has been generated for each read head, the system can concatenate the read vectors to generate a final read vector for the system input.

Additionally, the system can perform the erase, read, and write operations in any order. For example, in some implementations, the system erases, then writes, and then reads from the external memory. However, in other implementations, the system can perform these operations in a different order.

The process 200 can be performed for each system input in a sequence of system inputs to generate a sequence of system outputs for the sequence of system inputs. The sequence of system inputs can be a sequence for which the desired output, i.e., the output sequence that should be generated by the system for the input sequence, is not known. The system can also perform the process 200 on inputs in a set of training data, i.e., a set of inputs for which the output that should be predicted by the system is known, in order to train the system, i.e., to determine trained values for the parameters of the neural network and any additional parameters of processes used in erasing, writing, and reading from the external memory. Because the components of the system are entirely differentiable, the process 200 can be performed repeatedly on inputs selected from a set of training data as part of a conventional machine learning training technique to train the neural network, e.g., a stochastic gradient descent backpropagation through time training technique if the neural network is a recurrent neural network.

Figure 3:
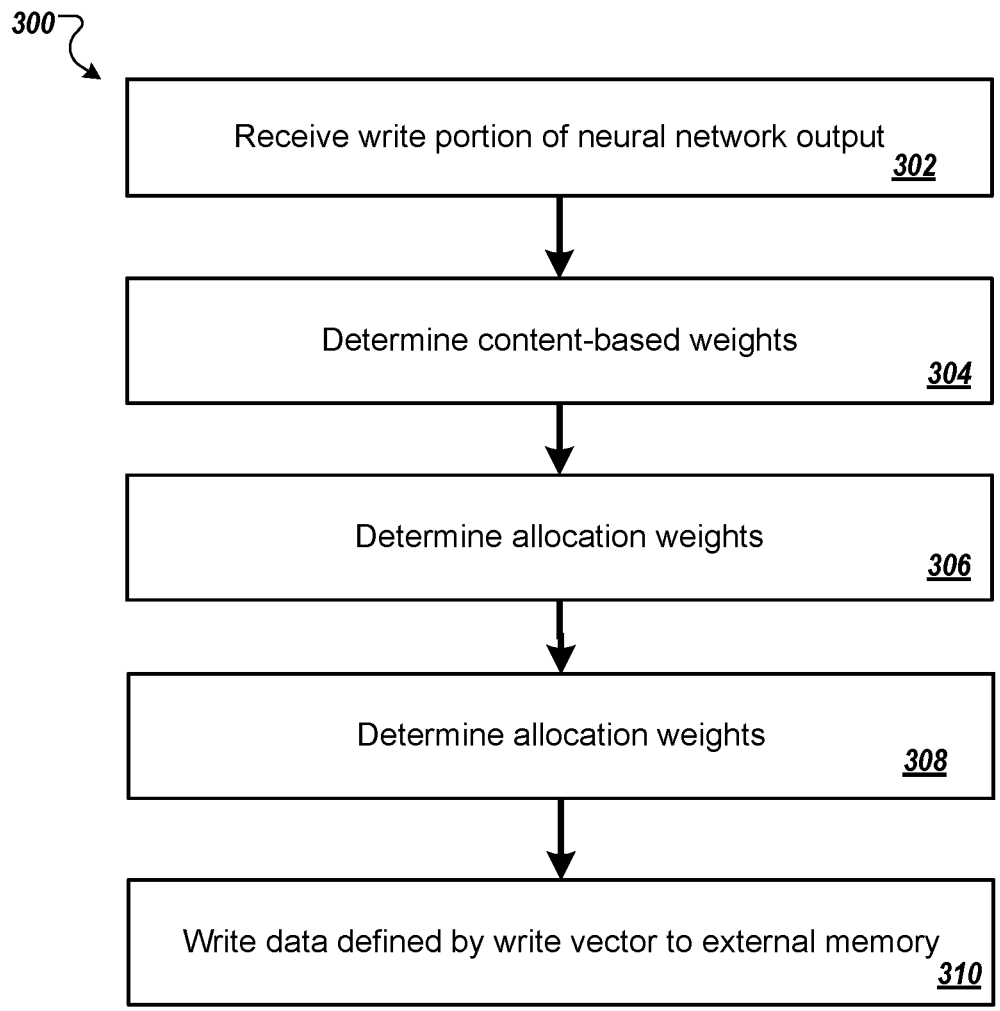
FIG. 3 is a flow diagram of an example process for writing to an external memory.

FIG. 3 is a flow diagram of an example process 300 for writing data to the external memory. For convenience, the process 300 will be described as being performed by a system of one or more computers located in one or more locations. For example, an augmented neural network system, e.g., the augmented neural network system 100 of FIG. 1A, appropriately programmed in accordance with this specification, can perform the process 300.

The system receives a write portion of the neural network output (step 302). The write portion of the neural network output includes a write key, a write strength value, a write vector, a set of free gates, an allocation gate, and a write gate. In some implementations, the system processes the write portion using one or more domain shifting functions to ensure that the values lie in the correct domain to generate the write key, write strength value, write vector, free gates, allocation gate, and write gate.

The system determines content-based weights for the locations in the external memory from the write key and the write strength value included in the write portion (step 304). Generally, the content-based weight for a given location reflects how similar the data at the location is to the write key. Determining content-based weights from a key is described below with reference to FIG. 8.

The system determines allocation weights for the locations in the external memory using the free gates and based on how available each of the locations in the external memory is for a modification of the data stored in the location (step 306). Generally, to determine the allocation weights, the system determines a usage value for each location that represents a degree to which the availability of the location is being used and then generates the allocation weights based on the usage values, the previous final writing weights for a previous neural network output, and the free gates. Generating the allocation weights is described in more detail below with reference to FIG. 4.

The system determines final writing weights for the locations in the external memory from the content-based weights and allocation weights (step 308).

In particular, the system uses the allocation gate, which governs interpolation between the content-based weights and the allocation, and the write gate, which governs the write strength of the current write to the external memory, to combine the allocation weight and the content-based weight for each location to generate the final writing weight for the location.

More specifically, for each location, the system interpolates between the content-based weight for the location and the allocation weight for the location in accordance with the allocation gate and then gates the result of the interpolation in accordance with the write gate to determine the final writing weight for the location.

The system writes data defined by the write vector to the external memory in accordance with the final writing weights (step 310). That is, to write to a given location in the external memory, the system multiplies the write vector by the final writing weight for the location to determine an adjusted write vector for the location and then sums the vector currently stored at the location with the adjusted write vector for the location.

Figure 4:
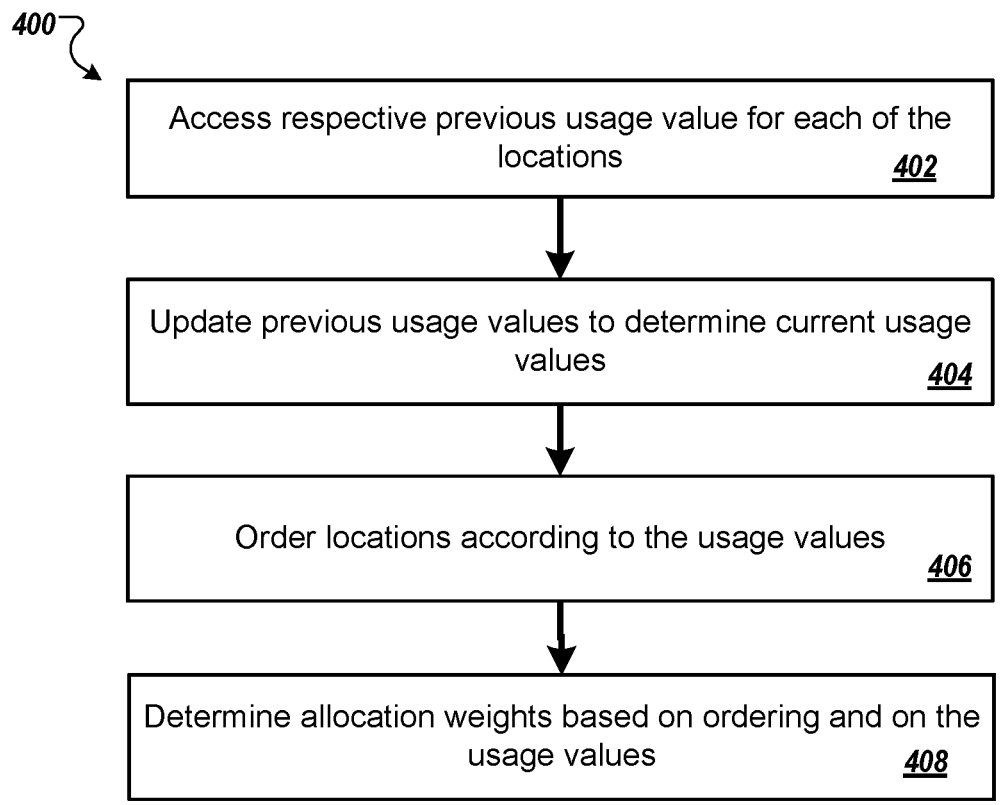
FIG. 4 is a flow diagram of an example process for determining allocation weights for locations in the external memory.

FIG. 4 is a flow diagram of an example process 400 for determining allocation weights for locations in the external memory. For convenience, the process 400 will be described as being performed by a system of one or more computers located in one or more locations. For example, an augmented neural network system, e.g., the augmented neural network system 100 of FIG. 1A, appropriately programmed in accordance with this specification, can perform the process 400.

The system accesses a respective previous usage value for each of the locations in the external memory (step 402).

The previous usage value for a given location represents a degree to which the availability of the location was being used before the previous write to the external memory. If the current write is the first write to the external memory, the system uses a default usage value, e.g., zero, as the previous usage value for each location.

The system updates the previous usage values to determine a respective current usage value for each location (step 404).

In particular, for each location, the system increases the previous usage value based on a previous final writing weight used to write to the location during the previous write to the location. If the current write will be the first write, the system does not increase the usage value.

For each location, the system then modifies the increased previous usage value for the location based on the free gates to determine the current usage value for the location. Generally, the free gates define an extent to which each of the locations can be freed when writing to the external memory.

In particular, the write portion includes a respective free gate for each read head that is used by the system to read from the external memory. The system determines a memory retention value for the location from the free gates and the previous final read weights for each read head. The memory retention value for a given location defines the degree to which the location will not be freed by the free gates.

In particular, in some implementations, the memory retention value $\psi_t$ for a given memory location satisfies:

$$\psi_t = \prod_{i=1}^{R}(1 - f_t^i w_{t-1}^{r,i}),$$

where i goes from 1 to the total number of read heads R, $f_t^i$ is the free gate for the i-th read head, and $w_{t-1}^{r,i}$ is the previous final read weight for the i-th read head.

The system then uses the memory retention value for the memory location to reduce the increased previous usage value for the memory location. In some implementations, the current usage value $u_t$ for a given memory location satisfies:

$$u_t = (u_{t-1} + w_{t-1}^w - u_{t-1} \cdot w_{t-1}^w) \cdot \psi_t,$$

where $u_{t-1}$ is the previous usage value for the location, $w_{t-1}^w$ is the previous final writing weight for the location, and $\psi_t$ is the memory retention value for the location.

The system orders the locations according to their usage values, i.e., in ascending order of usage (step 406).

The system then determines a respective allocation weight for each location based on the ordering and on the usage values for the locations (step 408).

In some implementations, the system determines a respective initial allocation weight for each location by subtracting the usage value for the location from one and then modifies the initial allocation weight for the location based on usage values for the other locations in other positions in the ordering to generate the allocation weight for the location.

In particular, in these implementations, for a given location, the system determines the product of the usage values for the locations that are less used than the given location, i.e., locations that are lower than the given location in the ordering. The system then modifies the initial allocation weight for the given location by multiplying the initial allocation weight by the product.

Figure 5:
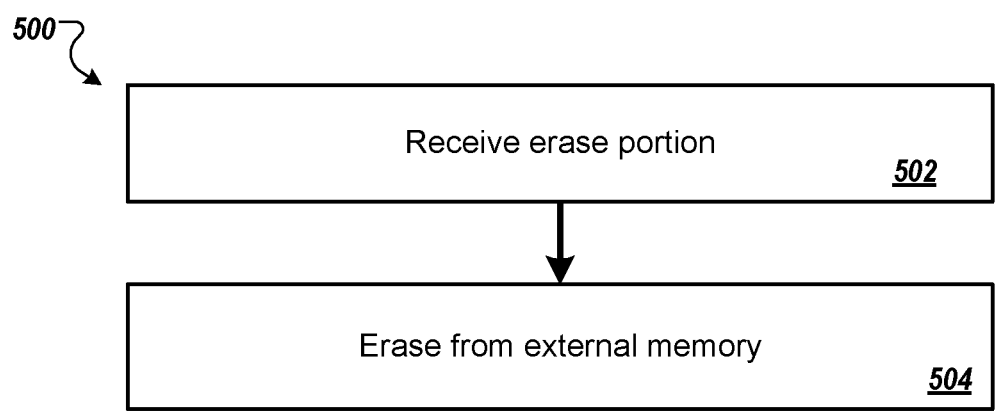
FIG. 5 is a flow diagram of an example process for erasing from the external memory.

FIG. 5 is a flow diagram of an example process 500 for erasing from the external memory. For convenience, the process 500 will be described as being performed by a system of one or more computers located in one or more locations. For example, an augmented neural network system, e.g., the augmented neural network system 100 of FIG. 1A, appropriately programmed in accordance with this specification, can perform the process 500.

The system receives an erase portion of the neural network output (step 502). The erase portion includes an erase vector. In some implementations, the system processes the erase portion with a domain shifting function that ensures that the values lie in the correct domain to generate the erase vector, i.e., to ensure that all the values in the erase vector are between zero and one, inclusive.

The system erases from the external memory using the erase vector and the final writing weights (step 504). In particular, for each location in the external memory, the system multiplies the erase vector by the final writing weight for the location to determine a weighted erase vector for the location. The system then subtracts the weighted erase vector for the location from a vector of all ones to generate a final erase vector and then performs an element wise multiplication of the vector currently stored at the memory location and the final erase vector to erase from the location.

Figure 6:
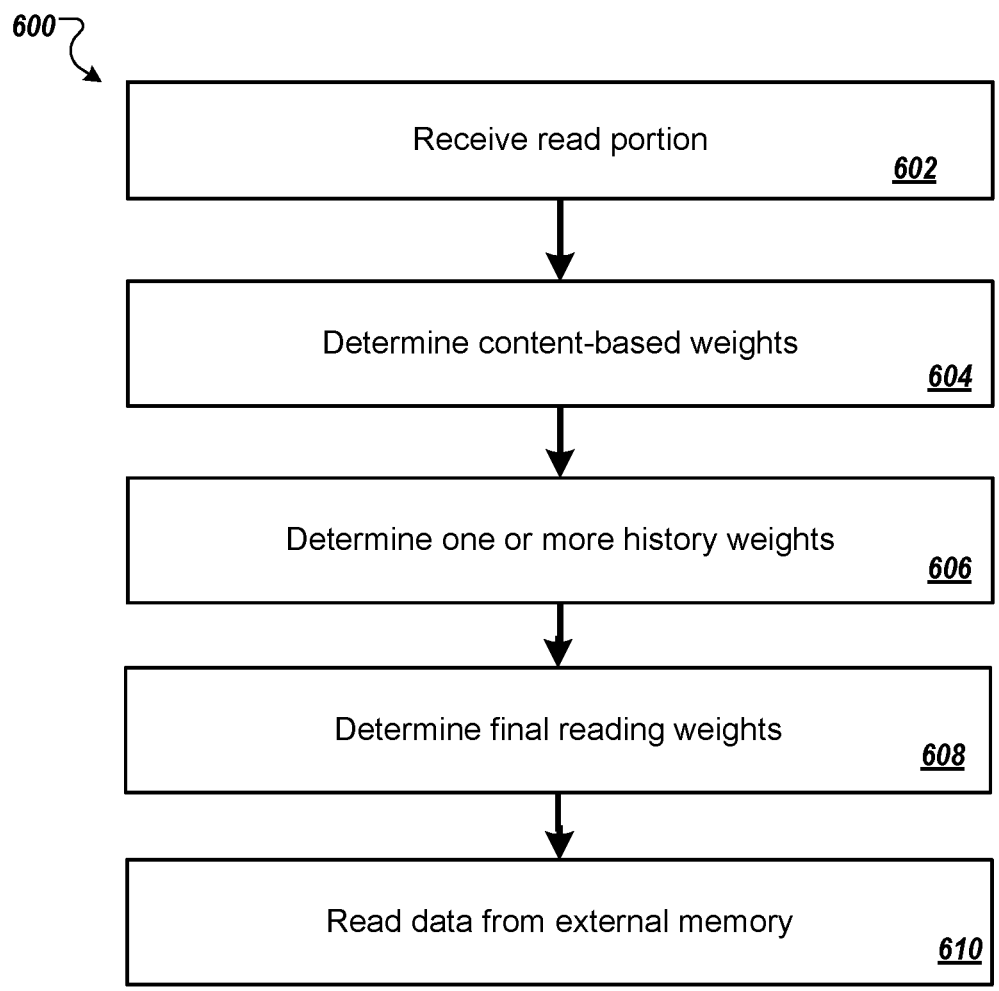
FIG. 6 is a flow diagram of an example process for reading from the external memory for a given read head.

FIG. 6 is a flow diagram of an example process 600 for reading from an external memory for a given read head. For convenience, the process 600 will be described as being performed by a system of one or more computers located in one or more locations. For example, an augmented neural network system, e.g., the augmented neural network system 100 of FIG. 1A, appropriately programmed in accordance with this specification, can perform the process 600.

The system can perform the process 600 for each of one or more read heads to generate a respective read vector for each read head.

The system receives a read portion of the neural network output for the read head (step 602). The read portion for the read head includes a read key, a read strength value, and a read mode vector for the read head. In some implementations, the system processes the read portion for the read head with one or more domain shifting functions to ensure that the values lie in the correct domain to generate the read key and the read mode vector for the read head.

The system determines content-based reading weights for each of the locations in the external memory from the read key and the read strength value for the read head (step 604). Generally, the content-based weight for a given location reflects how similar the data at the location is to the read key. Determining content-based weights from a key is described below with reference to FIG. 8.

The system determines one or more respective history weights for each of the locations in the external memory from weights of previous writing operations performed by the system (step 606).

Generally, the system maintains a temporal link matrix that tracks a history of writing weights for previous writing operations performed on the external memory by the system and determines the history weights using the temporal link matrix.

In some implementations, the system determines two history weights for each location: a backward history weight and a forward history weight.

Generating the history weights is described in more detail below with reference to FIG. 7.

The system determines final reading weights for the locations in the external memory from the content-based reading weights and the one or more history weights (step 608).

In particular, the system uses the read mode vector, which governs an interpolation between the one or more history weights and the content-based reading weights, to combine the one or more history weights and the content-based weight for each location to generate the final reading weight for the location. That is, the read mode vector includes a respective interpolation value for each history weight and for the content-based weight.

More specifically, for each location, the system interpolates between the one or more history weights for the location and the content-based weight for the location in accordance with the read mode vector to determine the final reading weight for the location.

The system reads data from the external memory in accordance with the final reading weights to generate a read data vector for the read head (step 610). In particular, the system generates a read data vector by combining the vector stored at each location in the external memory in accordance with the final reading weights. That is, the system computes a weighted sum of each vector stored in the external memory, with the weight for each vector being the final reading weight for the corresponding memory location, i.e., for the memory location where the vector is stored.

Figure 7:
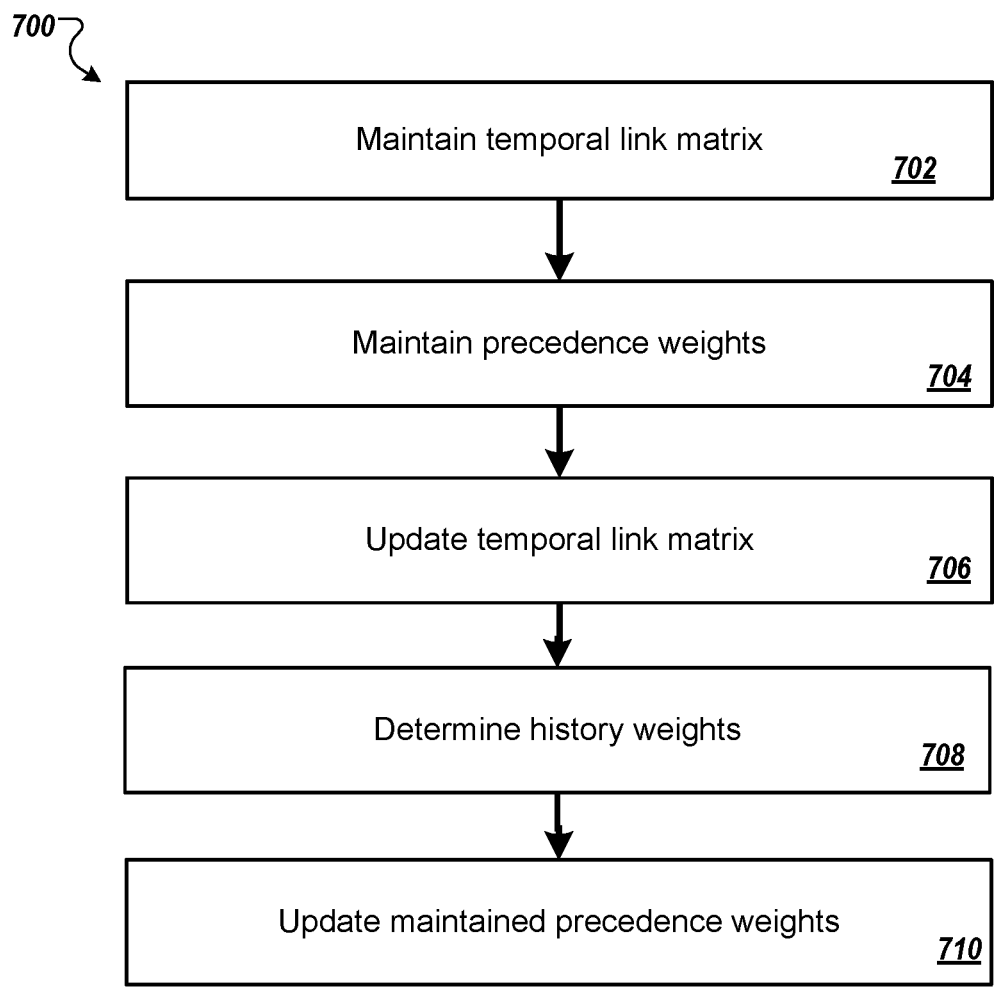
FIG. 7 is a flow diagram of an example process for determining history weights for a read head.

FIG. 7 is a flow diagram of an example process 700 for determining history weights for a read head. For convenience, the process 700 will be described as being performed by a system of one or more computers located in one or more locations. For example, an augmented neural network system, e.g., the augmented neural network system 100 of FIG. 1A, appropriately programmed in accordance with this specification, can perform the process 700.

The system maintains a temporal link matrix that tracks a history of writing weights for previous writing operations performed on the external memory by the system (step 702). In particular, element [i, j] of the temporal link matrix represents the degree to which location i was the location written to after location j by the previous writing operation for the previous neural network output.

The system also maintains a respective precedence weight for each of the locations that represents a degree to which the location was the last location written to by the previous write operation for the previous neural network output (step 704).

The system updates the temporal link matrix using the precedence weights and the final writing weights for the neural network output (step 706).

In particular, in some implementations the entry [i,j] of the updated temporal link matrix $L_t$ satisfies:

$$L_t[i,j]=(1-w_t[i]-w_t[j])L_{t-1}[i,j]+w_t[i]p_{t-1}[j],$$

where $w_t[x]$ is the current final writing weight for a location x in the external memory, $p_{t-1}[j]$ is the precedence weight for location j in the external memory, and $L_{t-1}[i, j]$ is the entry [i,j] of the temporal link matrix before the update.

In some implementations, prior to updating the temporal link matrix, the system can generate sparse current final writing weights from the current final writing weights and generate sparse precedence weights from the precedence weights and use the sparse writing and sparse precedence weights in updating the temporal link matrix, i.e., in place of the current final writing weights and the precedence weights. By updating the temporal link matrix using sparse weights, the system reduces the amount of memory and computation required to update the link matrix and to determine the history weights.

To determine sparse writing weights from the current writing weights, the system sets all but the K (a predetermined value that is less than the total number of locations in the external memory) highest writing weight values among the writing weights for all of the memory locations to zero and divides each of the remaining K weights by the sum of the remaining K weights. The system can determine the sparse precedence weights in a similar manner.

The system determines the history weights for the read head from the updated temporal link matrix and the previous final reading weights for the read head (step 708).

In some implementations, the system determines a backward history weight vector that includes a respective backward history weight for each memory location by performing a matrix multiplication between the updated temporal link matrix and a vector of the previous final reading weights for the read head for the previous neural network output.

In some of these implementations, the system also determines a forward history weight vector that includes a respective forward history weight for each memory location by performing a matrix multiplication between the transpose of the updated temporal link matrix and the vector of the previous final reading weights for the read head for the previous neural network output.

The system updates the maintained precedence weights to account for the current write to the external memory for use in updating the updated temporal read matrix before a next read from the external memory (step 710). In particular, before the initial write to the external memory, the precedence weight is zero for all of the memory locations.

After each write to the external memory, the system updates the precedence weights based on the current final writing weights for the current write operation and the previous precedence weights.

In particular, in some implementations, the system determines the updated precedence weight for a given location by multiplying the maintained precedence weight for the location by the difference between one and the sum of all of the writing weights for all of the memory locations for the current write operation to generate an adjusted maintained precedence weight. The system then adds the current final writing weight for the location to the adjusted maintained precedence weight for the location to determine the updated precedence weight for the location.

Figure 8:
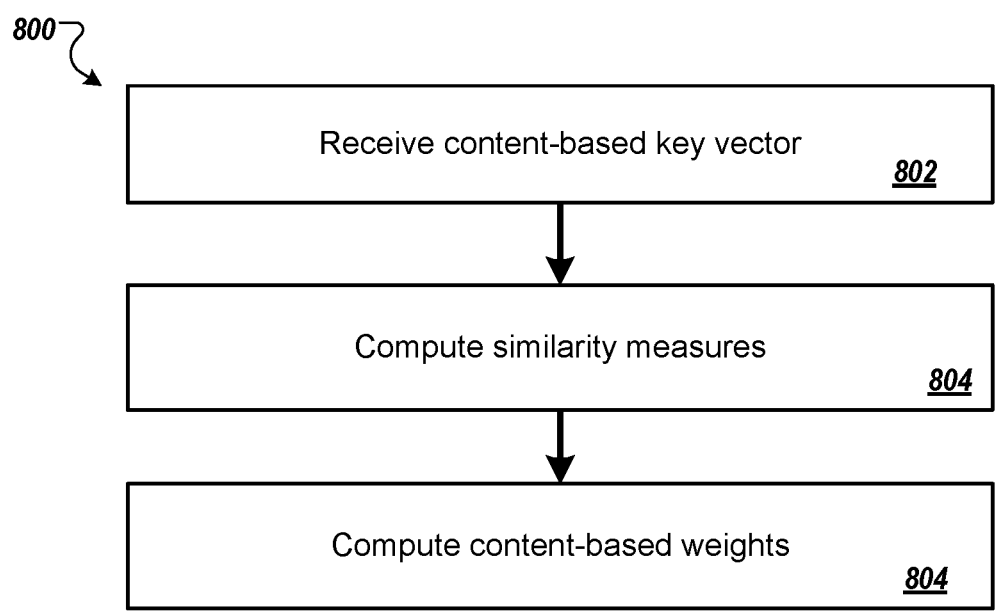
FIG. 8 is a flow diagram of an example process for generating content-based weights for locations in an external memory.

FIG. 8 is a flow diagram of an example process 800 for generating content-based weights for locations in an external memory. For convenience, the process 800 will be described as being performed by a system of one or more computers located in one or more locations. For example, an augmented neural network system, e.g., the augmented neural network system 100 of FIG. 1A, appropriately programmed in accordance with this specification, can perform the process 800.

The system receives a content-based key vector (step 802).

The system computes similarity measures between the content-based key vector and the vectors stored in the external memory (step 804). That is, the system computes a respective similarity measure between the content-based key vector and each vector stored in the external memory. For example, the similarity measure may be a cosine similarity measure, with the similarity K between the content-based key vector k(h,t) and a given vector M(i,•,t) located at the i-th location in the external memory M satisfying:

$$K(k(h,t), M(i, \cdot, t)) = \frac{k(h,t) \cdot M(i, \cdot, t)}{\|k(h,t)\| \|M(i, \cdot, t)\|}.$$

The system computes the content-based weights for the locations in the external memory using the similarity measures (step 806). Generally, the system computes the weights so that locations that have higher similarity measures with the content-based key vector are assigned higher weights. For example, the content-based weight for the i-th location in the external memory M may satisfy:

$$w_c(i, h, t) = \frac{\exp(\beta(h, t)K(k(h, t), M(i, \cdot, t)))}{\sum_{i'} \exp(\beta(h, t)K(k(h, t), M(i', \cdot, t)))},$$

where ß(h,t) is the key strength value for the content-based weights.

Depending on the implementation, the system can maintain various degrees of persistence of the data stored in the external memory based on outputs received from the neural network. For example, in some implementations, the system re-sets the external memory after each sequence of system inputs has been fully processed by the system. As another example, in some implementations, the data stored in the external memory persists between input sequences. That is, the system does not delete any data from the external memory between sequences of system inputs. In these implementations, the system may re-set the external memory after a given task assigned to the system is completed and before the system begins a different machine learning task. Alternatively, the system may maintain the external memory without deleting values even between tasks. Thus, while processing a current input sequence, the system may be able to leverage data stored in the memory while processing a previous input sequence or even while performing a previous machine learning task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An augmented neural network system for processing a sequence of system inputs to generate a sequence of system outputs, the augmented neural network system comprising:
    a neural network, wherein the neural network is configured to receive a sequence of neural network inputs and to process each neural network input to generate a neural network output from the neural network input, wherein the neural network output comprises:
        a system output portion,
        a read portion,
        a write key, and
        a write vector;
    an external memory; and
    a memory interface subsystem, wherein the memory interface subsystem is configured to perform operations comprising, for each of the neural network outputs:
        providing an output derived from the system output portion as a system output in the sequence of system outputs;
        determining a respective allocation weight for each of the plurality of locations in the external memory based on how available each of the plurality of locations in the external memory is for a modification of the data stored in the location, comprising:
            determining a respective usage value for each of the locations that represents a degree to which the availability of the location is being used, comprising, for each of the locations, increasing a previous usage value for the location based on a previous final writing weight used to write to the location for a previous neural network output, and
            determining the respective allocation weights for the locations based at least in part on the respective usage values for the locations;
        determining a respective final writing weight for each of the plurality of locations in the external memory from the respective allocation weight for the location;
        writing data defined by the write vector to the external memory in accordance with the final writing weights;
        determining one or more sets of reading weights for each of the plurality of locations in the external memory from the read portion;
        reading data from the external memory in accordance with the sets of reading weights; and
        combining the data read from the external memory with a next system input in the sequence of system inputs to generate a next neural network input in the sequence of neural network inputs.

2. The augmented neural network system of claim 1, wherein determining the respective allocation weights for the locations based at least in part on the respective usage values for the locations comprises:
    ordering the locations according to the usage values; and
    determining the respective allocation weights for the locations based on the ordering and on the usage values.

3. The augmented neural network system of claim 1, wherein the neural network output comprises a set of free gates that define an extent to which each of the plurality of locations can be freed when writing to the external memory, and wherein determining the respective usage value for each of the locations comprises:

modifying the increased previous usage value for the location based on the extent to which the location can be freed to generate the respective usage value for the location.

4. The augmented neural network system of claim 2, wherein ordering the locations according to the usage values comprises ordering the locations in ascending order of usage.

5. The augmented neural network system of claim 4, wherein determining the respective allocation weight for each of the locations comprises:
   determining an initial allocation weight for the location by subtracting the usage value for the location from one; and
   modifying the initial allocation weight based on the usage values for other locations in other positions in the ordering.

6. The augmented neural network system of claim 1, wherein the neural network output comprises:
   an allocation gate that governs interpolation between (i) content-based weights for the plurality of locations and (ii) the allocation weights, and
   a write gate that governs a write strength of the write to the external memory, and wherein determining a respective final writing weight for each of the plurality of locations comprises:
      interpolating between the content-based weight for the location and the allocation weight for the location in accordance with the allocation gate, and
      gating a result of the interpolation in accordance with the write gate to determine the final writing weight for the location.

7. The augmented neural network system of claim 1, wherein the neural network output further comprises an erase vector, and wherein the operations further comprise, for each of the neural network outputs:
   erasing from the external memory in accordance with the final writing weights and the erase vector.

8. An augmented neural network system for processing a sequence of system inputs to generate a sequence of system outputs, the augmented neural network system comprising:
   a neural network, wherein the neural network is configured to receive a sequence of neural network inputs and to process each neural network input to generate a neural network output from the neural network input, wherein the neural network output comprises:
      a system output portion,
      a write portion,
      a write vector, and
      a respective read key for each of one or more read heads;
   an external memory; and
   a memory interface subsystem, wherein the memory interface subsystem is configured to perform operations comprising, for each of the neural network outputs:
      providing an output derived from the system output portion as a system output in the sequence of system outputs;
      determining a respective writing weight for each of a plurality of locations in the external memory from the write portion of the neural network output;
      writing data defined by the write vector to the external memory in accordance with the respective writing weights;
      maintaining a temporal link matrix that tracks a history of writing weights for previous writing operations performed on the external memory by the memory interface subsystem, wherein each element in the temporal link matrix represents a degree to which a corresponding first location was written to after a corresponding second location by a previous writing operation for a previous neural network output;
      updating the temporal link matrix based on the writing weights for the neural network output;
      for each of one or more read heads:
         determining one or more respective history weights for each of the plurality of locations in the external memory from the updated temporal link matrix,
         determining a respective final reading weight for each of the plurality of locations from the one or more history weights, and
         reading data from the external memory in accordance with the final reading weights; and
      combining the data read from the external memory with a next system input in the sequence of system inputs to generate a next neural network input in the sequence of neural network inputs.

9. The augmented neural network system of claim 8, the operations further comprising, for each of the neural network outputs:
   determining one or more sets of erasing weights for each of the plurality of locations in the external memory; and
   erasing data from the external memory in accordance with the sets of erasing weights.

10. The augmented neural network system of claim 8, wherein the neural network output comprises a respective read mode vector for each read head that governs an interpolation between (i) the one or more history weights and (ii) content-based reading weights for the plurality of locations, and wherein determining a respective final reading weight for each of the plurality of locations from the one or more history weights comprises:
   interpolating between the one or more history weights for the location and the content-based reading weight for the location in accordance with the read mode vector.

11. The augmented neural network system of claim 8, wherein determining one or more respective history weights for each of the plurality of locations in the external memory comprises:
   determining a respective backward history weight for each of the plurality of locations from the updated temporal link matrix.

12. The augmented neural network system of claim 11, wherein determining a respective backward history weight for each of the plurality of locations from the updated temporal link matrix comprises:
   performing a matrix multiplication between the updated temporal link matrix and a vector derived from the final reading weights for the read head for a previous neural network output.

13. The augmented neural network system of claim 8, wherein determining one or more respective history weights for each of the plurality of locations in the external memory comprises:
   determining a respective forward history weight for each of the plurality of locations from a transpose of the updated temporal link matrix.

14. The augmented neural network system of claim 13, wherein determining a respective forward history weight for each of the plurality of locations from the updated temporal link matrix comprises:
   performing a matrix multiplication between the transpose of the updated temporal link matrix and a vector derived from the final reading weights for the read head for a previous neural network output.

15. The augmented neural network system of claim 8, wherein updating the temporal link matrix comprises:
   determining a respective precedence weight for each of the plurality of locations that represents a degree to which the location was the last location written to; and
   updating the temporal link matrix using the precedence weighting for each of the plurality of locations and the writing weights for the neural network output.

16. A method of processing a sequence comprising a plurality of system inputs to generate a sequence comprising a plurality of system outputs, the method comprising, for each of the system inputs:
   obtaining data previously read from an external memory during processing of a preceding system input;
      combining the data previously read from the external memory with the system input to generate a neural network input;
   providing the neural network input as input to a neural network, wherein the neural network is configured to process the neural network input to generate a neural network output from the neural network input, wherein the neural network output comprises:
      a system output portion,
      a read portion,
      a write key, and
      a write vector;
   determining a respective allocation weight for each of the plurality of locations in the external memory based on how available each of the plurality of locations in the external memory is for a modification of the data stored in the location, comprising:
      determining a respective usage value for each of the locations that represents a degree to which the availability of the location is being used, comprising, for each of the locations, increasing a previous usage value for the location based on a previous final writing weight used to write to the location for a previous neural network output, and
      determining the respective allocation weights for the locations based at least in part on the respective usage values for the locations;
      determining the respective allocation weights for the locations based at least in part on the respective usage values for the locations;
   determining a respective final writing weight for each of the plurality of locations in the external memory from the respective allocation weight for the location;
   writing data defined by the write vector to the external memory in accordance with the final writing weights;
   determining one or more sets of reading weights for each of the plurality of locations in the external memory from the read portion;
   reading data from the external memory in accordance with the sets of reading weights; and
   providing an output derived from the system output portion as a system output in the sequence of system outputs.

17. The method of claim 16, wherein determining the respective allocation weights for the locations based at least in part on the respective usage values for the locations comprises:
   ordering the locations according to the usage values; and
   determining the respective allocation weights for the locations based on the ordering and on the usage values.

18. The method of claim 17, wherein ordering the locations according to the usage values comprises ordering the locations in ascending order of usage.

19. The method of claim 18, wherein determining the respective allocation weight for each of the locations comprises:
   determining an initial allocation weight for the location by subtracting the usage value for the location from one; and
   modifying the initial allocation weight based on the usage values for other locations in other positions in the ordering.

20. The method of claim 16, wherein the neural network output further comprises an erase vector, and wherein the method further comprises, for each of the neural network outputs:
   erasing from the external memory in accordance with the final writing weights and the erase vector.

* * * * *